Figure 1:
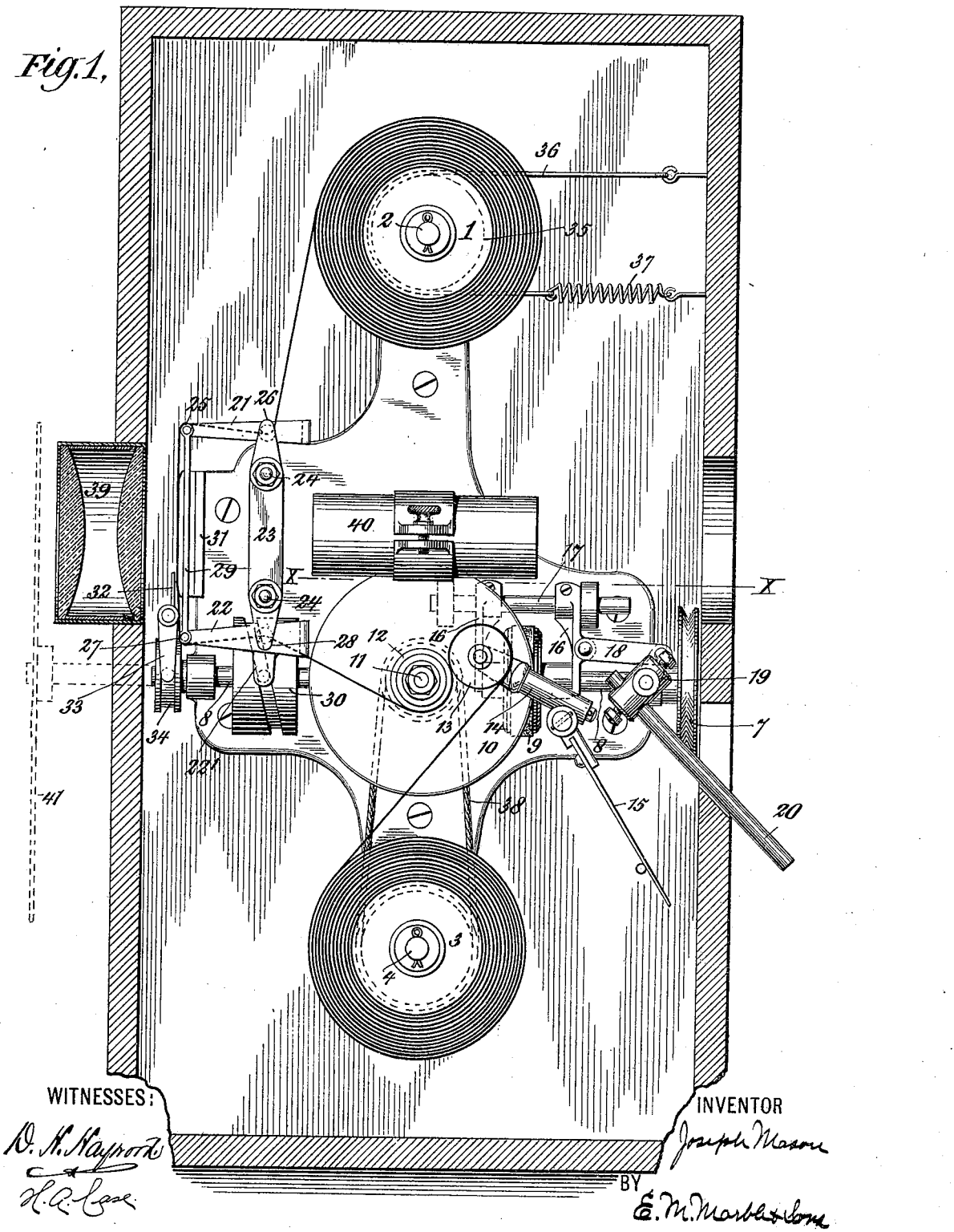

No. 629,582. Patented July 25, 1899.
J. MASON.
CONSECUTIVE VIEW APPARATUS.
(Application filed Oct. 22, 1898.)
(No Model.) 4 Sheets—Sheet 1.

WITNESSES: INVENTOR
Joseph Mason
BY
ATTORNEYS

No. 629,582. Patented July 25, 1899.
J. MASON.
CONSECUTIVE VIEW APPARATUS.
(Application filed Oct. 22, 1898.)
(No Model.) 4 Sheets—Sheet 2.
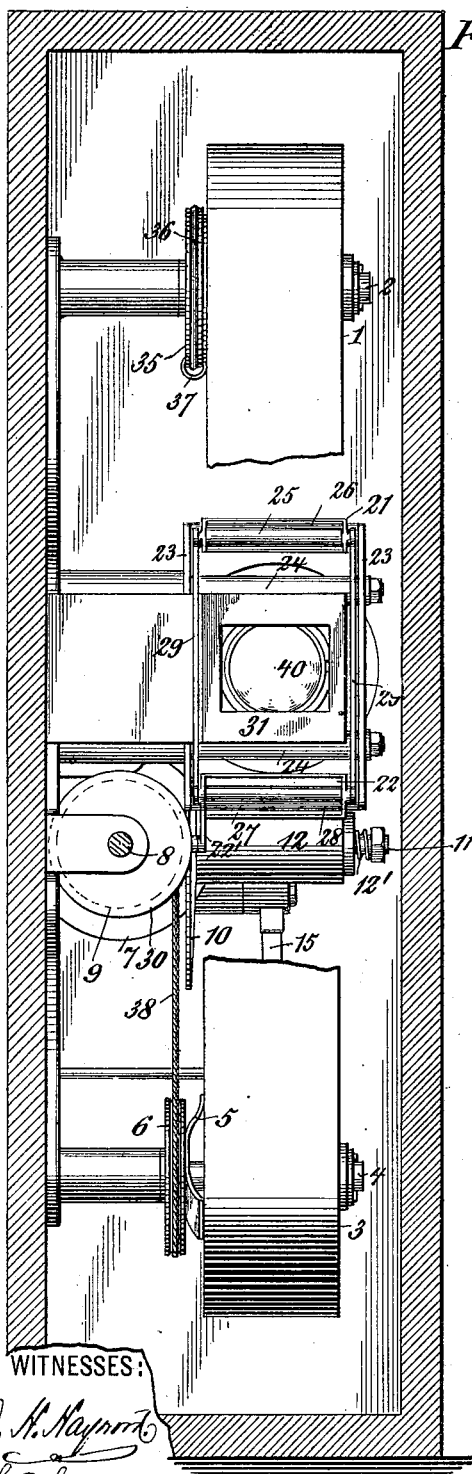
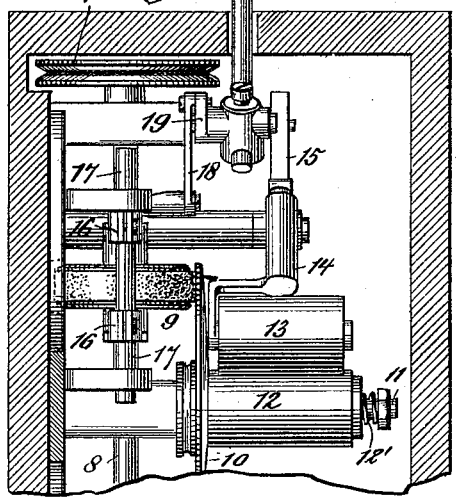
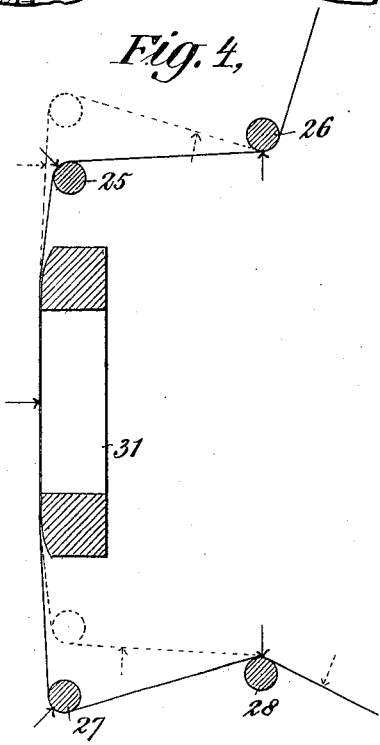
WITNESSES:
INVENTOR
Joseph Mason
BY
ATTORNEYS

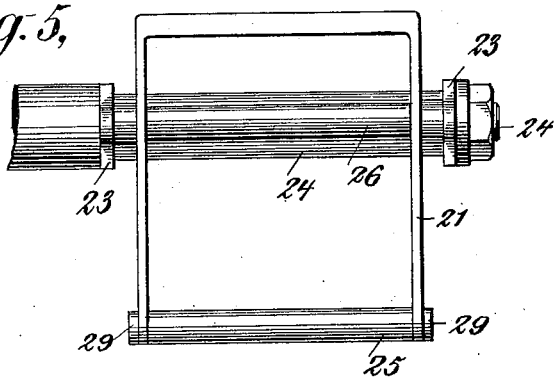
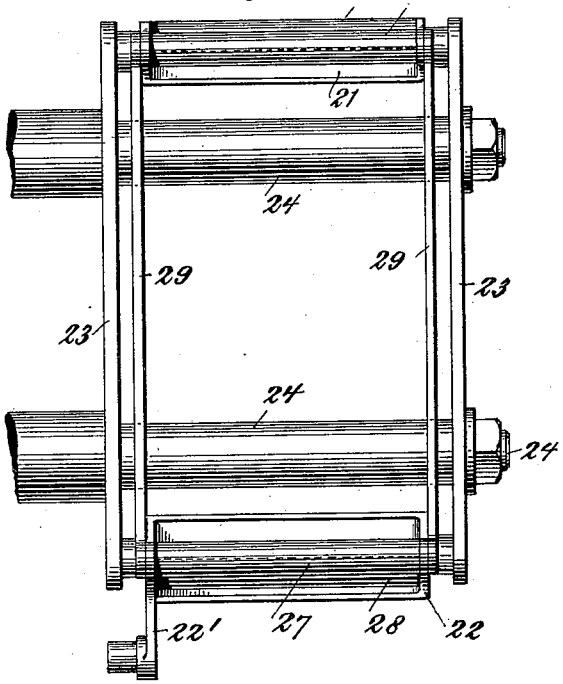

No. 629,582. Patented July 25, 1899.
J. MASON.
CONSECUTIVE VIEW APPARATUS.
(Application filed Oct. 22, 1898.)
(No Model.) 4 Sheets—Sheet 4.

WITNESSES: INVENTOR
Joseph Mason
BY
ATTORNEYS

United States Patent Office.

JOSEPH MASON, OF LONDON, ENGLAND, ASSIGNOR TO THE AMERICAN MUTOSCOPE COMPANY, OF NEW YORK, N. Y.

CONSECUTIVE-VIEW APPARATUS.

SPECIFICATION forming part of Letters Patent No. 629,582, dated July 25, 1899.

Application filed October 22, 1898. Serial No. 694,259. (No model.)

*To all whom it may concern:*

Be it known that I, JOSEPH MASON, a citizen of the United States, residing at London, England, have invented certain new and useful Improvements in Consecutive-View Apparatus; and I do hereby declare the following to be a full, clear, and exact description of the invention, such as will enable others skilled in the art to which it appertains to make and use the same.

My invention relates to improvements in consecutive-view apparatus such as are employed for taking series of photographs of objects in motion and for reproducing to the eye by means of such photographs the movements of objects; and my invention relates particularly to consecutive-view apparatus employing a long flexible film or picture-strip.

My invention consists in the combination, with suitable reels or other means for supplying and taking up a film or picture-strip and a feeding mechanism for drawing the film or strip from a supply-reel and delivering it to a take-up reel, of a vibrating support over which the film or strip passes when passing through the field of the apparatus and means for vibrating the support alternately in the direction of motion of the film and in the direction opposite thereto with a speed equal to that of the film, whereby successive portions of the film, although moving continuously from one reel to the other, are held stationary at intervals with respect to certain fixed objects of the apparatus, such as the lenses of a camera or projecting apparatus; and my invention consists, further, in the employment of means for rendering the periods of movement of the film or strip with reference to these fixed portions of the apparatus shorter than the periods during which said film or strip is held stationary with respect to such objects and in various details of combination, construction, and arrangement of the parts.

The objects of my invention are, first, to improve the construction of that class of consecutive-view apparatus employing flexible films or picture-strips and in which the film or picture-strip moves continuously while the apparatus is in operation and yet is held stationary in the field of view with reference to fixed portions of the apparatus during intervals of exposure or illumination and to increase the practicable rapidity of operation and decrease the vibration of such apparatus; second, to make the periods of motion of the film with reference to fixed portions of the apparatus shorter than the periods during which the film is stationary with reference to such fixed portions, and, third, to make the mechanism as simple and compact as possible, having few parts which move intermittently or in a vibratory manner and these parts as light as possible, and having means for adjusting the speed of the feeding mechanism to compensate for slipping or shrinkage of the film or picture-strip. These objects are attained in the machine herein described, and illustrated in the drawings which accompany and form a part of this specification, in which the same reference-numerals indicate the same or corresponding parts, and in which—

Figure 7:
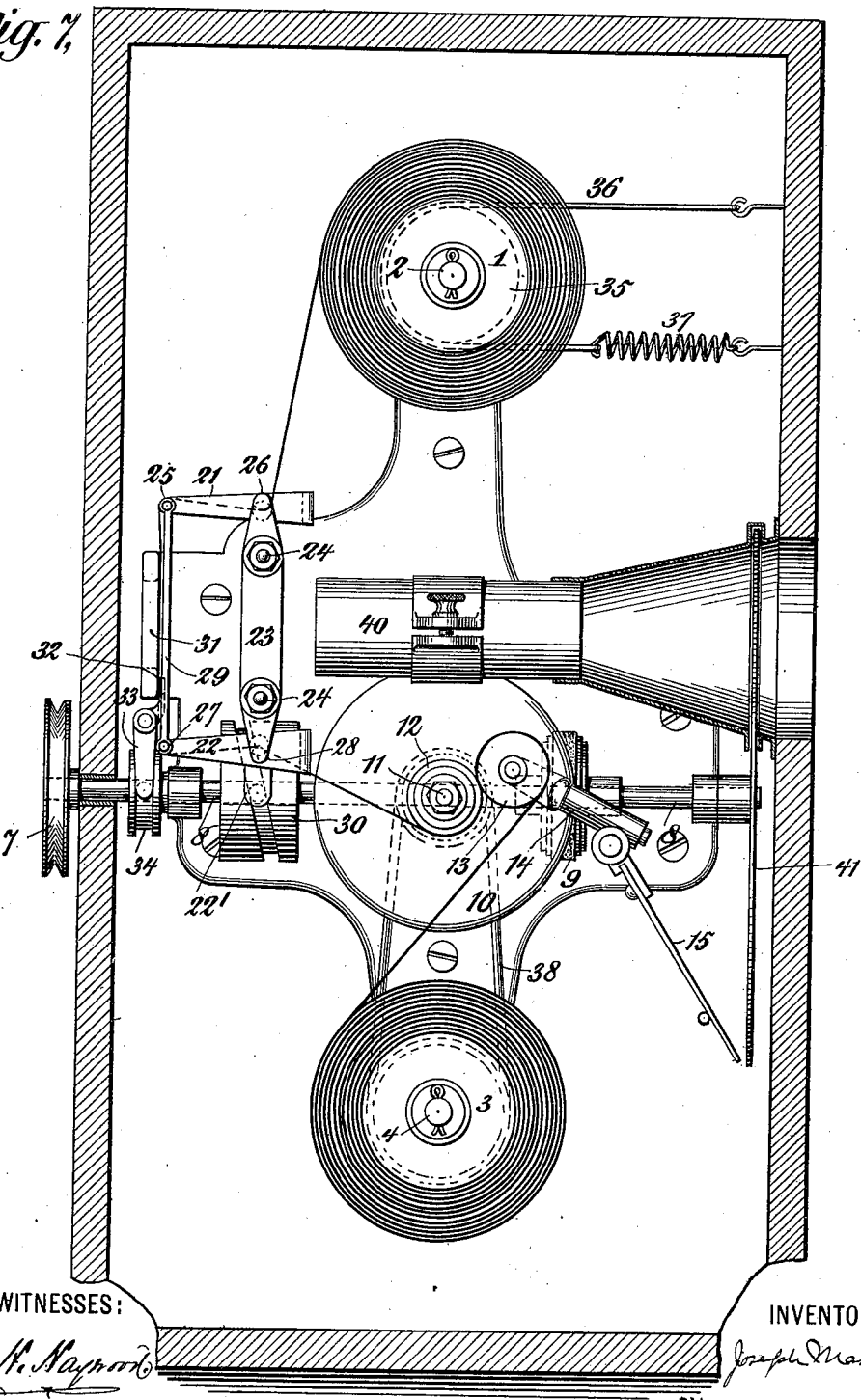

Figure 1 is a side elevation of the mechanism of a projecting consecutive-view apparatus embodying my invention, the inclosing case having been sectioned through the optical axis. Fig. 2 is a front elevation of the mechanism of the apparatus, the front of the inclosing case having been removed. Fig. 3 is a detail transverse vertical section upon the line $x\,x$ of Fig. 1, showing particularly the parts which feed the film. Fig. 4 is a diagram illustrating the action of the vibrating film-support. Fig. 5 is a detail plan view of the vibrating film-support on a larger scale than Figs. 1, 2, and 3. Fig. 6 is a detail front elevation of the vibrating film-support, and Fig. 7 is a side elevation of the mechanism of a camera constructed in accordance with my invention.

In the drawings, 1 is a supply spool or reel revolubly mounted on a spindle 2, and 3 is a take-up spool or reel revolubly mounted upon a spindle 4, but arranged to be driven frictionally through a spring-spider 5 from a pulley 6, mounted upon the same spindle 4 and itself driven by means hereinafter mentioned.

7 is the main driving-pulley, mounted upon a driving-shaft 8.

9 is a friction-wheel mounted upon shaft 8 and connected thereto by a spline, so as to be capable of longitudinal movement thereon.

10 is a friction-disk against which friction-wheel 9 presses and which is mounted upon a spindle 11 at right angles to the main driving-shaft 8. A feeding-roll 12, also mounted upon the spindle 11, is pressed against the disk 10 by a spring 12', so as to be driven frictionally by said disk, and the same spring serves to press the disk against friction-wheel 9. A second feeding-roll 13 is revolubly mounted upon a swiveled bracket 14 and is pressed against roll 12 by a spring 15.

Two lugs 16 16 upon a sliding bar 17 embrace the ends of the hub of the friction-wheel 9. One of these lugs is connected by a link 18 to a crank 19, which may be moved by a handle 20, thus moving the rod 17 longitudinally and shifting the position of the friction-wheel 9 radially with respect to the friction-disk 10 and so varying the speed of said disk.

21 and 22 are U-shaped frames forming double levers pivoted to plates 23, supported by studs 24. Lever 21 carries two guide-rollers 25 and 26, and lever 22 carries two corresponding guide-rollers 27 and 28. The film from reel 1 passes under roller 26, over rollers 25 and 27, and over roller 28, thence under feed-roll 12 and over feed-roll 13 to the winding-up reel 3. Rollers 26 and 28 are so placed that the film in passing them passes through the axial lines of the pivots of levers 21 and 22. Levers 21 and 22 are connected by links 29. Lever 22 is provided with a downward extension 22', carrying a pin working in a cam-groove of a cam 30 upon the main driving-shaft 8. The cam is so shaped that as the shaft 8 rotates levers 21 and 22 vibrate up and down, the velocity with which the rollers 25 and 27 are moved upward being precisely that which suffices to compensate for the simultaneous downward movement of the length of film between the rollers caused by the feed-rolls 12 and 13, so that while the rollers 25 and 27 are moving upward the length of film between them, although moving downward with respect to them, is held stationary with respect to fixed portions of the apparatus. When the rollers 25 and 27 move downward, the speed of the portion of the film between them is accelerated with respect to stationary objects, although its rate of linear movement with respect to the rollers on the levers 21 and 22 may not be varied. The levers 21 and 22 and connecting-links 29 constitute a vibrating support for the film.

31 is a plate located in the optical field and over which the film passes. It serves as a support for the film, and in order that the film may always be in contact therewith the plate is so placed that the film must deviate slightly from a direct course in passing over it. This is shown in Fig. 1 and also in Fig. 4.

In order to steady the film during the periods of exposure, a gripper may be employed for pressing the film at such intervals against the plate 31. 32 is this gripper. It is a flat spring mounted upon an arm 33, which carries a pin working in a cam-groove of a cam 34, mounted upon the main driving-shaft. The groove of the cam 34 is so shaped that the gripper 32 presses the film against the plate 31 the instant levers 21 and 22 and the parts connected therewith begin to move upward and holds the film against said plate until such upward movement of levers 21 and 22 has almost ceased, and when such upward movement has almost ceased the gripper is moved away from the film. This gripper is not shown in Fig. 2, it and the cam 34 and the parts connected therewith having been removed.

The supply-reel 1 is provided with a grooved pulley 35, over which passes a band-brake 36, having a spring 37 for producing the necessary tension on the band. The purpose of this brake is to prevent overrunning of the reel 1. The reel 3 is driven from the shaft on which disk 10 and feeding-roller 12 are mounted by a belt 38.

Figs. 1 to 3, inclusive, illustrate a consecutive-view-projecting apparatus, 39 being a condensing-lens and 40 an objective lens, and since the plate 31 is interposed between lenses 39 and 40 it is provided with a light-opening, as shown in Fig. 2, and thus forms a mat for the pictures; but the apparatus is equally adapted for use as a camera or as a direct-vision consecutive-view-reproducing apparatus, and in Fig. 7 such a camera is illustrated. It is not necessary, as a rule, to provide means for varying the speed of feeding of the film relative to the speed of the vibrating film-support in a camera, and hence in Fig. 7 no device is shown for moving the friction-wheel 9 upon its shaft. It is preferable in a camera to have the film-supporting plate 31 in the rear of the film, the gripper 32 working in the opposite direction to the gripper of the projecting apparatus.

In this specification the terms "film" and "picture-strip" are used interchangeably, since they are equivalents so far as the action of the feeding mechanism on them is concerned.

When the apparatus is used as a camera, it will of course contain a flexible sensitive photographic film. When it is used as a projecting apparatus, it will ordinarily contain a flexible transparent film having suitable pictures imprinted thereon, and when used as a direct-vision reproducing apparatus it may contain either such a film as may be employed for projection or a strip of paper or other suitable material with pictures imprinted thereon.

The operation of the apparatus is as follows: A supply-reel 1, having a suitable film or picture-strip thereon, having been placed in the apparatus, the end of the film is carried beneath the roller 26, over rollers 25 and 27, and over roller 28, under feed-roller 12, between feed-rollers 12 and 13, and over feed-roller 13 to the winding-up reel 3, to which it is secured in any suitable or customary manner. If the apparatus be a reproducing apparatus, such as is illustrated in the drawings, the film is so adjusted by means of suitable marks upon it that when the apparatus begins to operate the pictures upon it will register precisely with the opening in the plate 31 each time the levers 21 and 22 begin to move upward. The rotation of the main driving-shaft 8 may then be commenced. When said shaft rotates, the friction-disk 10 is also rotated, being driven by the friction-wheel 9, and the feed-roller 12 and winding-up reel 3 are thus caused to rotate, so drawing the film from the supply-reel 1 and winding it up on the reel 3; but as the film thus moves from reel 1 to reel 3 the film-support formed by levers 21 and 22 and the connecting-links move up and down. There is such correspondence between the distance between the several pictures on the film or picture-strip, the normal rate at which said strip is fed forward, and the rate at which levers 21 and 22 reciprocate up and down that one complete vibration of levers 21 and 22 takes place during the time that is normally occupied by the passage of one view-section of the film or picture-strip past such fixed portions of the apparatus as rollers 26 and 28, the rate at which the extremities of levers 21 and 22 move upward being precisely that which suffices to compensate for the downward movement of the film during the time said levers are moving upward and to hold stationary during such upward movement that portion of the strip which is in the optical field; but the continuous feeding of the film from reel 1 and between rollers 12 and 13 and the continuous winding up of the film on reel 3 continues during the movement of the levers 21 and 22 and the parts connected therewith, nor does such movement of the levers induce any alternate relaxation and tightening of the film, since the film in passing rollers 26 and 28 passes through the centers of vibration of levers 21 and 22. The motion of the film, therefore, is absolutely continuous with reference to the feeding mechanism, although with reference to the optical field it is intermittent. Since the parts of the apparatus which reciprocate back and forth and do not move continuously in one direction are comparatively few and may be made extremely light, the vibration of the apparatus when in operation is extremely slight, and a high rate of speed may be obtained without inducing vibration of the pictures upon the screen. Since the movement of levers 21 and 22 in no wise affects the passage of film from one reel to the other, the up and the down vibrations of levers 21 and 22 need not occupy the same time, but the down vibrations may take place in much less time than the up vibrations. In this way the periods of rest of the film with reference to the lenses and plate 31 may be made much longer than the periods of motion.

Slipping of the film with reference to the feed-rollers may make it necessary to vary the speed of said rollers slightly in order to prevent creeping of the pictures upon the screen. Shrinkage of the film may also compel some variation in the speed of the roller 12 from the normal in order that the pictures may be brought into registry with the opening in the plate 31 at the precise moments when levers 21 and 22 begin to move upward. Such variation may be effected by moving the handle 20, thus moving the friction-wheel 9 toward or from the center of the friction-disk 10, according as to whether the speed is to be decreased or increased. Variation in the rate of feeding disturbs slightly the exact correspondence between the downward movement of the film with reference to levers 21 and 22 and the parts connected therewith and the upward movement of said levers, and it is at such times that the use of the gripper 32 is especially valuable, for said gripper holds the film absolutely stationary with reference to the plate 31 during the intervals of exposure, the film meanwhile slipping slightly with reference to feed-roller 12 or else feed-roller 12 slipping slightly with reference to the disk 10; but the discrepancy between the speed of the film and the speed of the levers 21 and 22 is never so great that the slight variations in the rate of feeding of the film produced by this gripping action of the gripper 32 induce any perceptible strain upon the film.

I am aware that a patent has been granted for a consecutive-view apparatus in which the supply and winding-up reels and mechanism for drawing the film from the supply-reel and delivering it to the winding-up reel are all mounted upon a vertically-movable carriage which is reciprocated up and down by a crank and pitman, the purpose being to have the average rate of upward movement of the carriage during intervals of exposure equal to the linear velocity of the film, so as to hold substantially stationary that portion of the film which is in the optical field during exposure; but such apparatus is incapable of operating at a high rate of speed, because the comparatively great weight and the consequent inertia of the film-reels, the film thereon, and the feeding mechanism make it impossible to reciprocate such parts rapidly without inducing objectionable vibration. In the apparatus herein illustrated and described the reels and feeding mechanism are not reciprocated, the only parts which reciprocate being the parts of a small and very light film-support, which because of its lightness may be reciprocated at a high rate of speed and moved through a considerable amplitude without producing vibration. The gripper 32 also acts to check vibration of the film.

The shaft 8 may carry a shutter 41, as indicated in dotted lines in Fig. 1 and as shown in Fig. 7. Instead of pivoted levers 21 and 22 being used in the reciprocating film-support flat springs may be employed, being obviously equivalent to the levers 21 and 22.

Having thus completely described my invention, what I claim, and desire to secure by Letters Patent, is—

1. In a consecutive-view apparatus, the combination, with reels or equivalent means for supplying and taking up a flexible film or picture-strip, and mechanism for feeding the film through the field of the apparatus, of a movable film-support, independent of said reels or equivalent means, and over which the film passes when passing through the field of the apparatus, said support being mounted to move in a direction opposite to that of the film passing over it, and means for so moving said support at a speed substantially equal to that of the film passing over it, whereby the portion of the film passing over said support may be held stationary, at intervals, in the field of the apparatus, substantially as described.

2. In a consecutive-view apparatus, the combination, with reels or equivalent means for supplying and taking up a flexible film or picture-strip, and mechanism for feeding the film through the field of the apparatus, of a movable film-support, independent of said reels or equivalent means and of said feeding mechanism, and over which the film passes when passing through the field of the apparatus, said support being mounted to move at intervals in a direction opposite to that of the film passing over it, and means for so moving said support at a speed substantially equal to that of the film passing over it, whereby the portion of the film passing over said support may be held stationary, at intervals, in the field of the apparatus, substantially as described.

3. In a consecutive-view apparatus, the combination, with reels or equivalent means for supplying and taking up a flexible film or picture-strip, and mechanism for feeding the film through the field of the apparatus, of a movable film-support, independent of said reels or equivalent means, and over which the film passes when passing through the field of the apparatus, said support being mounted to move at intervals in a direction opposite to that of the film passing over it, and having stationary axes through which the film passes when passing to and from said support, and means for moving said support in a direction opposite, but at a speed substantially equal, to that of the film passing over it, whereby the portion of the film passing over said support may be held stationary, at intervals, in the field of the apparatus, substantially as described.

4. In a consecutive-view apparatus, the combination, with reels or equivalent means for supplying and taking up a flexible film or picture-strip, and mechanism for feeding the film through the field of the apparatus, of a vibrating film-support, independent of said reels or equivalent means, and over which the film passes when passing through the field of the apparatus, said film-support being arranged to move alternately in the direction of motion of the film passing over it and in the direction opposite thereto, and a uniform-motion cam for vibrating said support, arranged to move it in the direction opposite to that of the film with a velocity substantially equal to that of the film, whereby the portion of the film passing over said support may be held stationary, at intervals, in the field of the apparatus, substantially as described.

5. In a consecutive-view apparatus, the combination, with reels or equivalent means for supplying and taking up a flexible film or picture-strip, and mechanism for feeding the film through the field of the apparatus, of a vibrating film-support, independent of said reels or equivalent means, and over which the film passes when passing through the field of the apparatus, said film-support being arranged to move alternately in the direction of motion of the film passing over it and in the direction opposite thereto, and a uniform-motion cam for vibrating said support, arranged to move it in the direction opposite to that of the film with a velocity substantially equal to that of the film, and so proportioned that the period during which the support is moved in opposition to the motion of the film is longer than the period during which said support is moving with the film, whereby the portion of the film passing over said support may be held stationary, at intervals, in the field of the apparatus, and for longer periods than the periods of motion of the film through the field of the apparatus, substantially as described.

6. In a consecutive-view apparatus, the combination, with reels or equivalent means for supplying and taking up a flexible film or picture-strip, and mechanism for feeding the film through the field of the apparatus, of vibrating guides independent of said reels or equivalent means, and over which the film passes when passing to and from the field of the apparatus, said guides being arranged to move in arcs of circles and to move alternately in the direction of motion of the film passing over them, and in the direction opposite thereto, means for so moving said guides, and means for passing the film through the centers of vibration of said guides as it passes to and from said guides, substantially as described.

7. In a consecutive-view apparatus, the combination, with reels or equivalent means for supplying and taking up a flexible film or picture-strip, and mechanism for feeding the film through the field of the apparatus, of two pivoted arms located upon opposite sides of the field of the apparatus, and carrying guides over which the film passes when passing to and from the field of the apparatus, means for vibrating said arms alternately in the direction of motion of the film and in the direction opposite thereto, and means for passing the film through the centers about which said arms vibrate as it passes to and from the guides, substantially as described.

8. In a consecutive-view apparatus, the combination, with reels or equivalent means for supplying and taking up a flexible film or picture-strip, and mechanism for feeding the film through the field of the apparatus, of two pivoted arms located upon opposite sides of the field of the apparatus and provided with guides over which the film passes when passing through the field of the apparatus, a uniform-motion cam acting upon one of said arms and adapted to vibrate said arms alternately in the direction of motion of the film and in the direction opposite thereto, and other guides for passing the film through the centers about which said arms vibrate as it passes to and from said guides, substantially as described.

9. In a consecutive-view apparatus, the combination, with reels or equivalent means for supplying and taking up a flexible film or picture-strip, and mechanism for feeding the film through the field of the apparatus, of a movable film-support independent of said reels or equivalent means, and over which the film passes when passing through the field of the apparatus, said support being arranged to move alternately in the direction of motion of the film passing over it and in the direction opposite thereto, means for vibrating said support, arranged to move it in the direction opposite to that of the film with a velocity substantially equal to that of the film, and a gripping device arranged to grip the film and hold it stationary in the field of the apparatus during the intervals when the vibrating support is moving in the direction of motion of the film, substantially as described.

10. In a consecutive-view apparatus, the combination, with reels or equivalent means for supplying and taking up a flexible film or picture-strip, and mechanism for feeding the film through the field of the apparatus, of a movable film-support independent of said reels or equivalent means, and over which the film passes when passing through the field of the apparatus, said support being arranged to move alternately in the direction of motion of the film passing over it and in the direction opposite thereto, means for vibrating said support, arranged to move it in the direction opposite to that of the film with a velocity substantially equal to that of the film, a gripping device arranged to grip the film and hold it stationary in the field of the apparatus during the intervals when the vibrating support is moving in the direction of motion of the film, and means for varying the rate of feeding of the film, substantially as described.

11. In a consecutive-view apparatus, the combination, with reels or equivalent means for supplying and taking up a flexible film or picture-strip, and mechanism for feeding the film through the field of the apparatus, of a movable film-support, independent of said reels or equivalent means, and over which the film passes when passing through the field of the apparatus, said support being arranged to move alternately in the direction of motion of the film passing over it and in the direction opposite thereto, means for vibrating said support, arranged to move it in the direction opposite to that of the film with a velocity substantially equal to that of the film, a stationary film-support interposed between those parts of said vibrating support over which the film passes when passing to and from the field of the apparatus, a gripper, and means for operating the same, adapted to cause said gripper to press the film against said stationary support during the intervals when the vibrating support is moving in the direction opposite to the direction of motion of the film, substantially as described.

12. In a consecutive-view apparatus, the combination, with reels or equivalent means for supplying and taking up a flexible film or picture-strip, a main driving-shaft, and film-feeding rolls driven thereby, of a movable film-support having film-guides located upon opposite sides of the field of the apparatus, and over which the film may pass, said support imparting motion to the portion of the film passing over it independent of the motion imparted thereto by the feeding-rolls, and a cam on said driving-shaft arranged to move said film-support alternately in the direction of motion of the film and in the direction opposite thereto, substantially as described.

13. In a consecutive-view apparatus, the combination, with reels or equivalent means for supplying and winding up a flexible film or picture-strip, a main driving-shaft, and film-feeding rolls driven thereby, of a movable film-support having film-guides located upon opposite sides of the field of the apparatus, and over which the film may pass, a cam on said driving-shaft arranged to move said film-support alternately in the direction of motion of the film and in the direction opposite thereto, a gripper adapted to hold the film stationary in the field of the apparatus while said film-support is moving in the direction opposite to the direction of motion of the film, and a second cam on said driving-shaft for operating said gripper, substantially as described.

14. In a consecutive-view apparatus, the combination, with reels or equivalent means for supplying and winding up a flexible film or picture-strip, a main driving-shaft, film-feeding rolls, and speed-changing mechanism interposed between said driving-shaft and feeding-rolls, by which the speed of the rolls may be varied, of a movable film-support having film-guides located upon opposite sides of the field of the apparatus, and over which the film may pass, a cam on said driving-shaft arranged to move said film-support alternately in the direction of motion of the film and in the direction opposite thereto, a gripper adapted to hold the film stationary in the field of the apparatus while said film-support is moving in the direction opposite to the direction of motion of the film, and a second cam on said driving-shaft for operating said gripper, substantially as described.

15. In a consecutive-view apparatus, the combination, with film-reels or equivalent devices, and film-feeding mechanism, of a film-support, carrying the portion of the film which is in the field of the apparatus, which support is independent of the reels, is movable in the direction of motion of the film through said field, and imparts motion to the film passing over it independent of the motion imparted thereto by the feeding mechanism, and means for vibrating the support alternately in the direction of motion of the film, and in the opposite direction, substantially as described.

16. In a consecutive-view apparatus, the combination, with film-reels or equivalent devices, and film-feeding mechanism, of a film-support, independent of the reels and movable in the direction of motion of the film, mechanism for vibrating the same alternately in the direction of motion of the film, and in the opposite direction, and a gripper, substantially as described.

17. In a consecutive-view apparatus, the combination, with film-reels or equivalent devices, film-feeding mechanism, and means for varying the rate of feeding of the film, of a film-support, independent of the reels, and movable in the direction of motion of the film for vibrating the same alternately in the direction of motion of the film, and in the opposite direction, and a gripper, substantially as described.

In testimony whereof I affix my signature in the presence of two witnesses.

JOSEPH MASON.

Witnesses:
H. D. JAMESON,
A. NUTTING.